United States Patent
Kim et al.

(10) Patent No.: US 8,046,634 B2
(45) Date of Patent: Oct. 25, 2011

(54) INTEGRATED CIRCUIT CARD WITH CONDITION DETECTOR

(75) Inventors: Sun-Kwon Kim, Suwon-si (KR);
Byeong-Hoon Lee, Mapo-gu (KR);
Ki-Hong Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1026 days.

(21) Appl. No.: 11/869,990

(22) Filed: Oct. 10, 2007

(65) Prior Publication Data

US 2008/0109682 A1 May 8, 2008

(30) Foreign Application Priority Data

Nov. 6, 2006 (KR) .................. 10-2006-0109127

(51) Int. Cl.
*G06F 11/00* (2006.01)
(52) U.S. Cl. .................................................. 714/23
(58) Field of Classification Search .............. 714/23; 702/132
See application file for complete search history.

(56) References Cited

U.S. PATENT DOCUMENTS

| | | | | |
|---|---|---|---|---|
| 5,203,000 A * | 4/1993 | Folkes et al. | .................. | 713/340 |
| 5,557,739 A * | 9/1996 | Gupta et al. | .................... | 714/34 |
| 5,864,656 A * | 1/1999 | Park | ........................ | 714/10 |
| 6,047,248 A * | 4/2000 | Georgiou et al. | ............. | 702/132 |
| 6,714,891 B2 * | 3/2004 | Dendinger | .................... | 702/132 |
| 7,159,153 B2 * | 1/2007 | Kim | .............................. | 714/48 |
| 7,716,528 B2 * | 5/2010 | Hayem | .......................... | 714/30 |
| 7,761,274 B1 * | 7/2010 | Pippin | ............................ | 703/14 |
| 2003/0149914 A1 * | 8/2003 | Kim | ................................ | 714/30 |

FOREIGN PATENT DOCUMENTS

| | | |
|---|---|---|
| JP | 09-054710 | 2/1997 |
| JP | 2001-242901 | 9/2001 |
| JP | 2005-165470 | 6/2005 |
| JP | 2006-085516 | 3/2006 |
| KR | 1020060003434 A | 1/2006 |
| KR | 1020060034995 A | 4/2006 |

* cited by examiner

*Primary Examiner* — Amine Riad
(74) *Attorney, Agent, or Firm* — Volentine & Whitt, PLLC

(57) ABSTRACT

An integrated circuit card includes a central processing unit, a memory and an abnormal condition detector. The memory stores data to be processed by the central processing unit. The abnormal condition detector detects whether at least one operating condition of the integrated circuit card is within one of a suspend region or a reset region. The abnormal condition detector controls an operation of the central processing unit in accordance with the detection.

13 Claims, 6 Drawing Sheets

(PRIOR ART)

INTEGRATED CIRCUIT CARD WITH CONDITION DETECTOR

CROSS-REFERENCE TO RELATED APPLICATIONS

A claim of priority is made to Korean Patent Application No. 10-2006-0109127, filed on Nov. 6, 2006, the subject matter of which is hereby incorporated by reference.

BACKGROUND

1. Field of the Invention

The present invention disclosed herein relates to semiconductor devices, and more particularly, to an integrated circuit cards having condition detectors.

2. Description of the Related Art

A smart card includes an embedded microprocessor and a memory, or includes a memory without a logic unit. A microprocessor card is able to add, erase and process data, but a memory chip card (e.g., a prepaid phone card) is able to perform only certain predetermined functions. Unlike a magnetic strip card, a smart card internally executes and processes all required functions and information, and thus does not need to access a remote database. Nowadays, smart cards are rapidly developing with new markets and applications, and may be generally classified into three types: integrated circuit (IC) microprocessor cards, IC memory cards and optical memory cards.

With recent implementation of electronic funds transactions and financial services, the stability and security of chips in an electronic apparatus are becoming increasing important. Insufficient stability and security may cause data to be improperly stored. Experiments evaluating chip stability and security may be performed by varying external factors. For example, surge or ripple components may be added to an external power source voltage. The stability and security of the chip may be also evaluated by rapidly varying a frequency of an external clock, or an external temperature.

In a normal mode, chip signals are affected by various internal and external factors. The most significant signal is an address/data signal transferred between a processing unit and a memory. Potential harmful effects on address/data signals due to internal and external factors are discussed below.

Referring to FIG. 1, which shows a normal timing operation of an IC card, a valid address is obtained from a processing unit at a rising edge of a clock signal. The processing unit must therefore provide a stable address before a rising edge of the clock signal. In the normal mode, data corresponding to the valid address may be provided to the processing unit from a memory. Otherwise, as illustrated in FIG. 2, if a frequency f2 is higher than a normal frequency f1, the memory (and/or peripheral devices) will obtain an address on a bus before the processing unit loads a valid address into the bus based on the time of the rising edge of the higher frequency clock signal. The address obtained by the memory will therefore be invalid and may result in a malfunction of the chip. In another case, as illustrated in FIG. 3, the processing unit may be late in outputting an address, e.g., because of degradation in functions (or drivabilities) of transistors in the processing unit. Therefore, although the clock signals operate in the same frequency (f1), the memory may obtain an invalid address. As a result, a malfunction may occur in the chip.

When operational conditions of a chip change due to external factors, a processing unit may be initialized (or re-initialized) to prevent chip malfunction. The initialization provides chip security. However, the chip may be initialized even when the operational environments vary rapidly under hacking or otherwise unstable conditions. Such variations in the external environment may cause degradation of chip stability during the initialization.

SUMMARY OF THE INVENTION

An aspect of the present invention provides an integrated circuit card, including a central processing unit and a memory for storing data to be processed by the central processing unit. The integrated circuit card also includes an abnormal condition detector for detecting whether at least one operating condition of the integrated circuit card is within one of a suspend region or a reset region, and for controlling an operation of the central processing unit in accordance with the detection.

When the operating condition is in the suspend region, the abnormal condition detector may cause the operation of the central processing unit to be suspended. When the operating condition is stabilized in a normal region, the abnormal condition detector may cause the operation of the central processing unit to resume. When the operating condition is in the reset region, the abnormal condition detector unit may cause the central processing unit to initialize. Also, when the operating condition continues in the suspend state for a predetermined period of time, the abnormal condition detector may cause the central processing unit to initialize.

When the abnormal condition detector detects a change of an operation mode of the central processing unit, the abnormal condition detector may cause the operation of the central processing unit to be suspended. The change of the operation mode of the central processing unit may include a change to a normal mode from a stop mode.

The at least one operating condition may include at least one of an external power source voltage, a frequency of a clock signal, temperature and an internal power source voltage. Detecting functions of the at least one operating condition may be selectively performed by a host.

Another aspect of the present invention provides an integrated circuit card, including a central processing unit, a memory, an external condition detecting block, an internal condition detecting block and a control signal generator. The memory stores data to be processed by the central processing unit. The external condition detecting block detects whether an external operating condition is within one of a suspend region or a reset region, and outputs corresponding suspend information or reset information based on the external condition detection. The internal condition detecting block detects whether an internal operating condition is in a suspend region or a reset region, and outputs corresponding suspend information or reset information based on the internal condition detection. The control signal generator selectively activates a suspend detection signal in response to the suspend information from at least one of the external and internal condition detectors and a reset detection signal in response to the reset information output from at least one of the external and internal condition detectors. An operation of the central processing unit is suspended in response to activation of the suspend detection signal and initialized in response to activation of the reset detection signal.

Each of the external condition detecting block and the internal condition detecting block may output the suspend information when the corresponding operating condition is in a range of the suspend region, and the control signal generator activates the suspend detection signal in response to the suspend information. The control signal generator may activate the reset detection signal when the suspend detection signal remains activated for a predetermined period of time. Also, each of the external condition detecting block and the internal condition detecting block may output the reset information when the corresponding operating condition is in a range of the reset region, and the control signal generator activates the reset detection signal in response to the reset information.

The internal condition detecting block may be configured to detect a change of an operation mode and outputs the suspend information based on the detected change. When the operation mode changes to a normal mode from a stop mode, for example, the internal condition detecting block may output the suspend information for a predetermined time, and the control signal generator may activate the suspend detection signal in response to the suspend information.

The external operating condition may include at least one of an external power source voltage, a frequency of a clock signal and a temperature. The internal operation condition may include an internal power source voltage. Detecting functions of the external operating condition and the internal operating condition may be selectively performed by a host.

The external condition detecting block may include an external voltage detector, a temperature detector and a frequency detector. The external voltage detector activates one of a first suspend signal as the suspend information or a first reset signal as the reset information based on whether an external power source voltage is in an external voltage suspend region or an external voltage reset region. The temperature detector activates one of a second suspend signal as the suspend information or a second reset signal as the reset information based on whether a temperature is in a temperature suspend region or a temperature reset region. The frequency detector activates a third suspend signal as the suspend information or a third reset signal as the reset information based on whether a frequency of a clock signal is in a frequency suspend region or a frequency reset region. Also, the internal condition detecting block may include an internal voltage detector, which activates a fourth suspend signal as the suspend information or a fourth reset signal as the reset information based on whether an internal power source voltage is in an internal voltage suspend region or an internal voltage reset state.

The control signal generator may include a suspend detection signal generator, a counter and a reset detection signal generator. The suspend detection signal generator activates the suspend detection signal in response to at least one of the first through fourth suspend signals. The counter begins a counting operation upon activation of the suspend detection signal and stops the counting operation upon inactivation of the suspend detection signal. The reset detection signal generator activates the reset detection signal in response to at least one the first through fourth reset signals and an output of the counter. The counter may generate a pulse signal when the suspend detection signal continues to be active for a predetermined time, and the reset detection signal generator may activate the reset detection signal in response to the pulse signal.

BRIEF DESCRIPTION OF THE DRAWINGS

The embodiments of the present invention will be described with reference to the attached drawings, in which like reference numerals refer to like parts throughout the various figures unless otherwise specified.

DETAILED DESCRIPTION OF THE EMBODIMENTS

Figure 1:
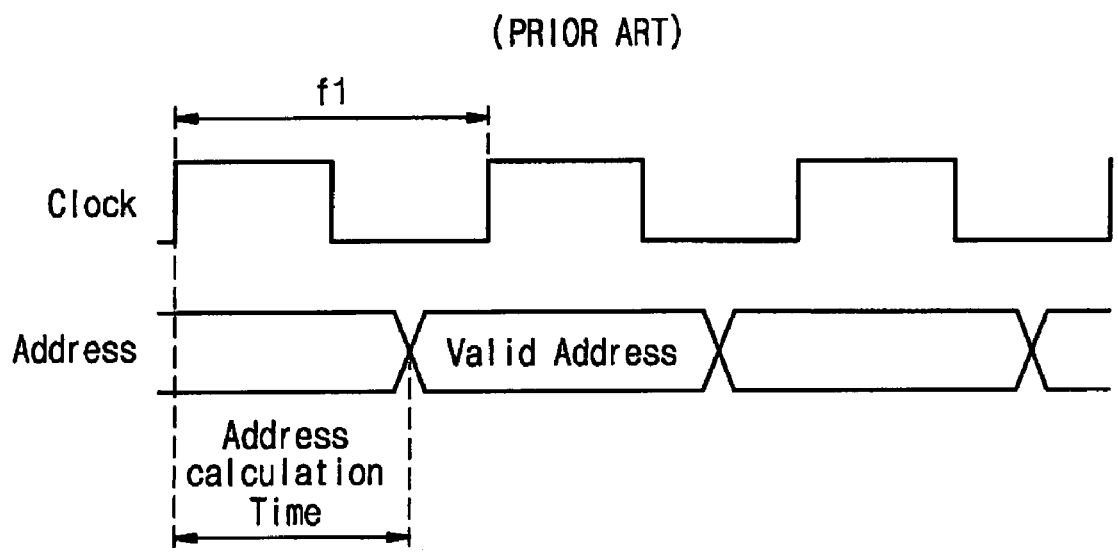
FIGS. 1 through 3 are timing diagrams showing operations of an integrated circuit card according to various operational conditions.
Figure 2:
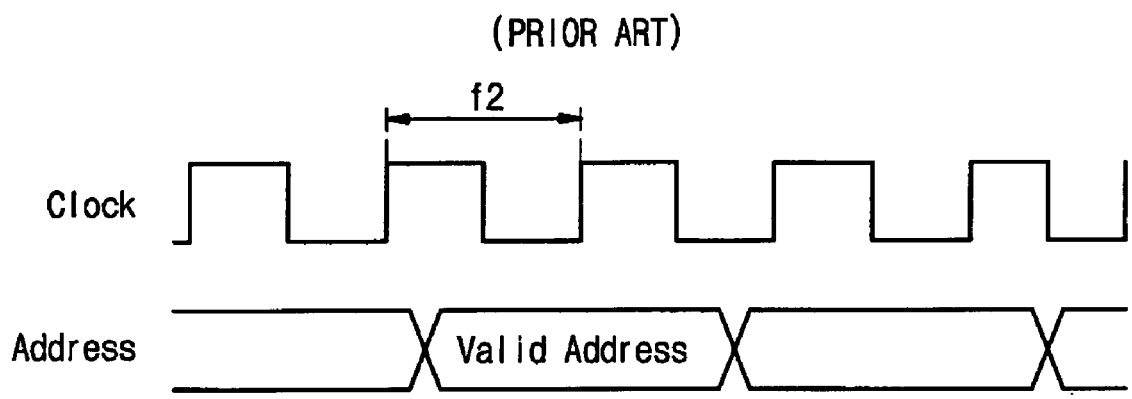
Figure 3:
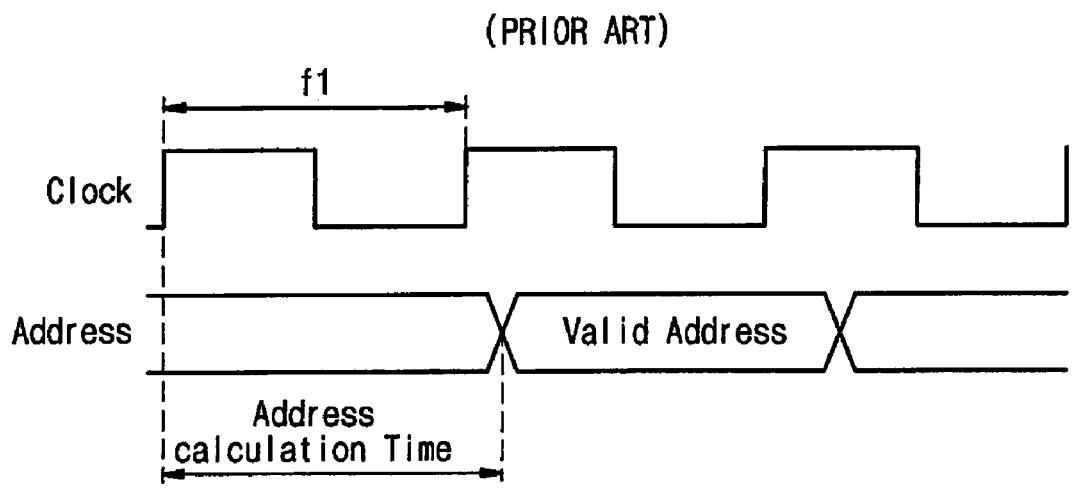

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

Figure 4:
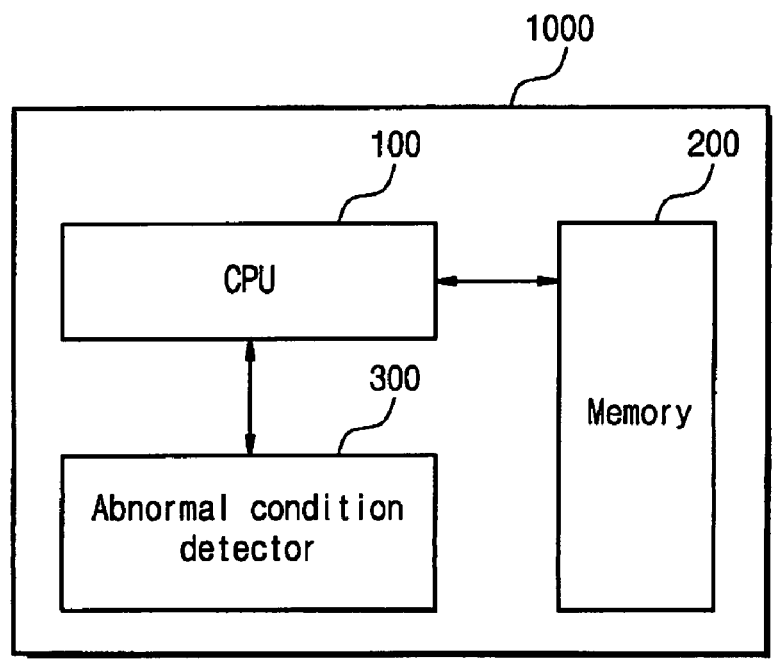
FIG. 4 is a schematic block diagram of an integrated circuit card, according to an exemplary embodiment of the present invention.

FIG. 4 is a schematic block diagram of an IC card according to an exemplary embodiment of the present invention. The IC card 1000 includes of a central processing unit (CPU) 100, a memory (or a program memory) 200 and an abnormal condition detecting unit 300. Although not shown in FIG. 4, it is well known by those skilled in the art that the IC card 1000 includes various functional units or applications. Also, the IC card 1000 may be a contact-type or contactless card. The IC card 1000 may communicate with a host, such as a card reader (or master device) in accordance with a predetermined operation mode.

The CPU 100 provides an address to the memory 200 and processes data provided by the memory 200 in response. The CPU 100 and the memory 200 are well known, and thus will not be described in further detail. The abnormal condition detecting unit 300 is configured to detect variations of external and internal environments and/or operating conditions of the IC card 1000. The external and internal conditions may include, for example, an external power source voltage, a clock signal, temperature, an internal voltage, an operation mode and the like.

In the present embodiment, the CPU 100 is set to a suspended or reset state or condition in accordance with detections made by the abnormal condition detecting unit 300. For example, when the abnormal condition detecting unit 300 determines that the external and internal conditions are unstable, the CPU 100 is set to a suspended state based on this determination. When the CPU 100 is set to the suspended state, the CPU 100 is temporarily stopped, and not initialized (or re-initialized). When the external and internal conditions stabilize, the CPU 100 is set to the normal state and resumes the previously suspended operation, thus improving the stability of the IC card 1000. In comparison, when the abnormal condition detecting unit 300 determines that the external or internal conditions present security risks, e.g., hacking, the CPU 100 is set to a reset state based on this determination. When the CPU 100 is set to the reset state, the CPU 100 initializes the IC card 1000, thus improving the security of the IC card 1000.

In other words, according to the present embodiment, the CPU 100 may be suspended depending on a status of the external and internal conditions. When the external and internal conditions are unstable, but with no hacking or other security threats, the CPU 100 is suspended. When the external and internal conditions are stabilized again, the CPU 100 resumes its suspended operation. Thus, security of the IC card is enhanced by preventing the IC card from initializing merely due to an unstable state of the external and internal conditions.

Figure 5:
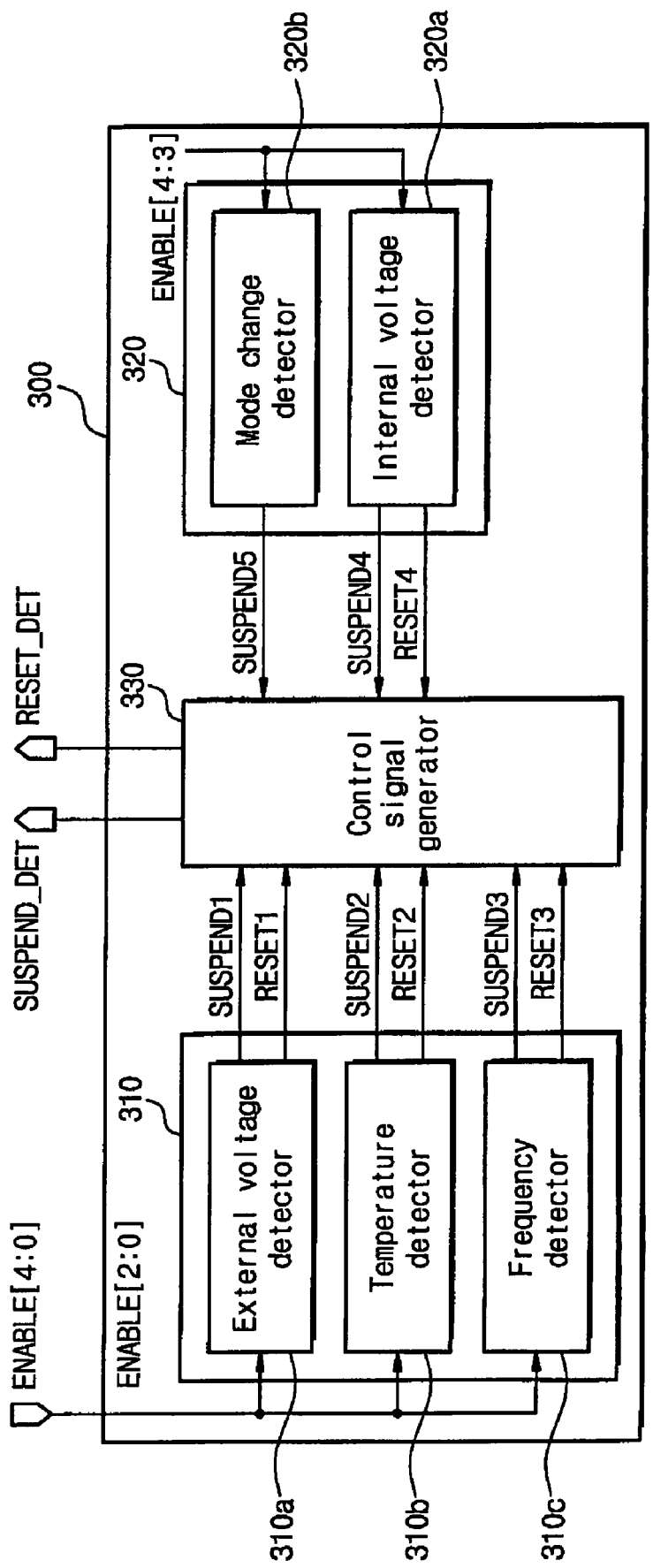
FIG. 5 is a schematic block diagram of the abnormal condition detector shown in FIG. 4, according to an exemplary embodiment of the present invention.
Figure 6:
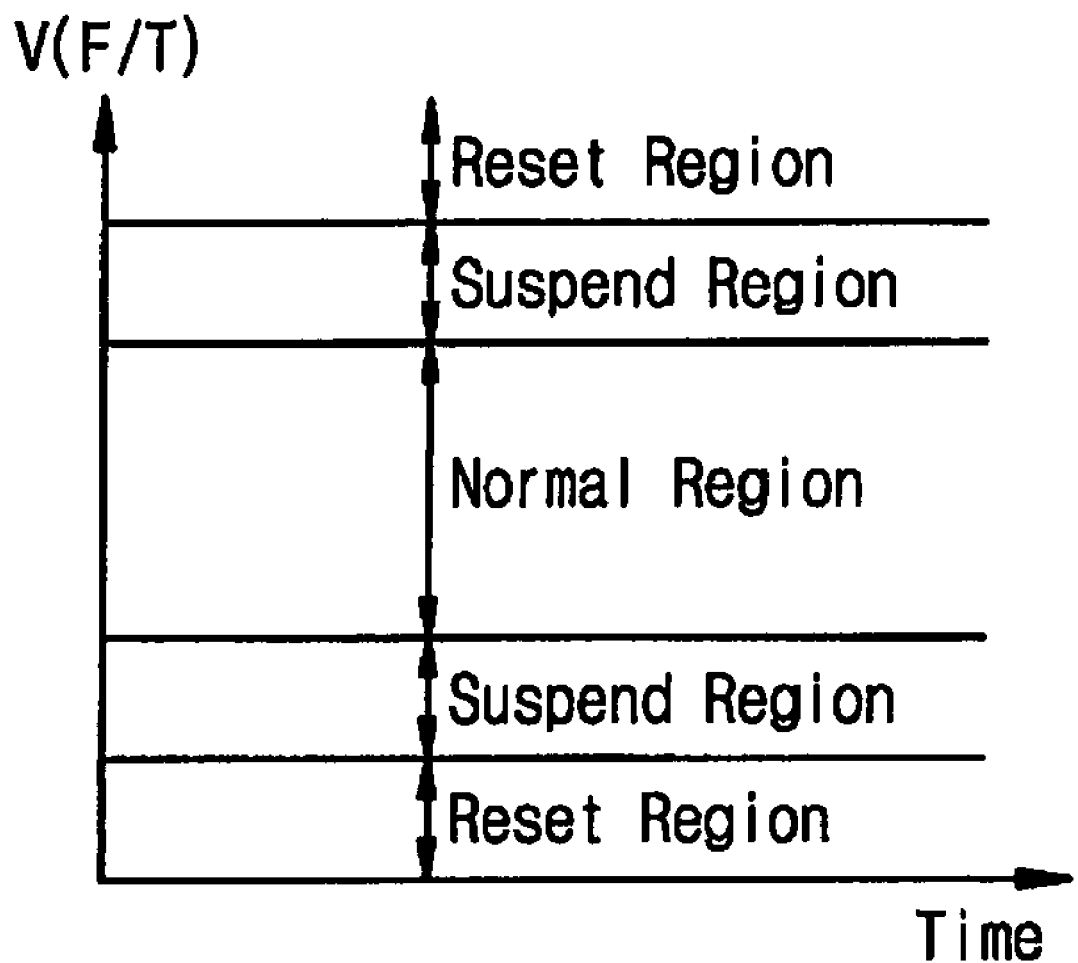
FIG. 6 is a schematic diagram illustrating detection regions of the detectors of FIG. 4, according to an exemplary embodiment of the present invention.

FIG. 5 is a schematic block diagram of the abnormal condition detector shown in FIG. 4, according to an exemplary embodiment of the present invention. FIG. 6 is a schematic diagram illustrating detection regions of the detectors of FIG. 4.

Referring to FIG. 5, the abnormal condition detecting unit 300 includes an external condition detecting block 310, an internal condition detecting block 320 and a control signal generator 330. The external condition detecting block 310 detects variation of external conditions or environments, and outputs suspend or reset (initializing) information to the control signal generator 330 in accordance with results of the detection. The external condition detecting block 310 includes an external voltage detector 310a, a temperature detector 310b and a frequency detector 310c. Although not shown in FIG. 5, it is understood by those skilled in the art that additional detectors, such as a ripple detector, may be included in the external condition detecting block 310 for detecting additional external conditions, without departing from the spirit and scope of the present invention.

In an exemplary embodiment of the present invention, as illustrated in FIG. 6, operational regions of the IC card 1000 may be divided into three regions, i.e., a normal region, a suspend region and a reset region. The normal region represents permissible ranges of various conditions, such as voltage, temperature and frequency. The reset region represents a range of extreme conditions which would cause a malfunction. The suspend region, between the normal and reset regions, indicates an unstable state, not corresponding to the reset state, but outside of the permissible range of conditions (e.g., voltage, temperature and frequency). The conditions are detected and compared to the various regions by the external condition detector 310, which generates suspend and/or reset information, as the case may be, in accordance with the results of the determination.

For example, the external voltage detector 310a may operate to determine whether a power source voltage (hereinafter, referred to as "external power source voltage") supplied to the IC card 1000 is in the suspend region. When it determines that the external power source voltage is within the suspend region, the external voltage detector 310a activates a suspend signal SUSPEND1. When the external power source voltage returns to the normal region from the suspend region, the external voltage detector 310a inactivates the suspend signal SUSPEND1. Likewise, when it determines that the external power source voltage is in the reset region, the external voltage detector 310a activates a reset signal RESET1.

The temperature detector 310b operates to determine whether a current temperature of the IC card 1000 is in a range corresponding to the suspend region. When it determines that the temperature is within the suspend region, the temperature detector 310b activates a suspend signal SUSPEND2. When the temperature returns to the normal region from the suspend region, the temperature detector 310b inactivates the suspend signal SUSPEND2. Likewise, when it determines that the temperature is in the reset region, the temperature 310b activates a reset signal RESET2.

The frequency detector 310c operates to determine whether a frequency of a clock signal applied to the IC card 1000 is in the suspend region. When it determines that the frequency of the clock signal is in the suspend region, the frequency detector 310c activates a suspend signal SUSPEND3. When the frequency of the clock signal returns to the normal region from the suspend region, the frequency detector 310c inactivates the suspend signal SUSPEND3. Likewise, when it determines that the frequency of the clock signal is within a range of the reset region, the frequency detector 310c activates a reset signal RESET3.

As shown in FIG. 5, the internal condition detecting block 320 includes an internal voltage detector 320a and a mode change detector 320b. Although not shown in FIG. 5, it is understood by those skilled in the art that additional detectors may be included in the internal condition detecting block 320 for detecting additional internal conditions or events, without departing from the spirit and scope of the present invention.

The internal voltage detector 320a operates to detect whether an internal voltage is outside the normal region, and outputs a suspend signal or reset signal according to a result of the detection. For instance, when it determines that the internal power source voltage is in the suspend region, the internal voltage detector 320a activates a suspend signal SUSPEND4. When the internal power source voltage returns to the normal region from the suspend region, the internal voltage detector 320a inactivates the suspend signal SUSPEND4. Likewise, when it determines that the internal power source voltage is in the reset region, the internal voltage detector 320a activates a reset signal RESET4.

The mode change detector 320b operates to detect a change of an operation mode, and outputs a suspend signal SUSPEND5 based on a result of the detection. For instance, the mode change detector 320b activates the suspend signal SUSPEND5 for a predetermined time based on a detected change of an operation mode.

The control signal generator 330 selectively activates a suspend detection signal SUSPEND_DET and a reset detection signal RESET_DET in response to the suspend signals SUSPEND1 to SUSPEND5 and the reset signals RESET1 to RESET4, respectively, from the external and internal condition detecting blocks 310 and 320. The suspend and reset detection signals SUSPEND_DET and RESET_DET are provided to the CPU 100 of FIG. 4. The control signal generator 330 activates the suspend detection signal SUSPEND_DET when at least one of the suspend signals SUSPEND1 to SUSPEND5 is activated. When the suspend detection signal SUSPEND_DET becomes active, the CPU 100 is set to the suspend mode. More specifically, the CPU 100 temporarily stops the operation being processed. When the suspend signal becomes be inactive, the control signal generator 330 inactivates the suspend detection signal SUSPEND_DET. As the suspend detection signal SUSPEND_DET becomes inactive, the CPU 100 resumes the suspended operation. The control signal generator 330 activates the reset detection signal RESET_DET when at least one of the reset signals RESET1 to RESET4 is activated. In response to the activation of the reset detection signal RESET_DET, the CPU 100 conducts an initializing operation.

In the exemplary embodiment of the present invention, the detectors 310a, 310b, 310c, 320a and 320b of the abnormal condition detecting unit 300 are independently controlled by the CPU 100. For example, the detectors 310a, 310b, 310c, 320a and 320b of the abnormal condition detecting unit 300 are each controlled by enabling signals ENABLE [4:0] to ENABLE [4:4]. Also, the abnormal condition detecting unit 300 is controlled by enabling signal ENABLE [2:0]. According to this control scheme, the functions of the detectors may be controlled through user selection. For example, in a hostile environment (e.g., extreme temperatures) of the IC card 1000, a user may discontinue functions of the temperature detector 310b through a register set operation by the CPU 100. Other functions may also be selectively implemented. This functional selection may be helpful in preventing unnecessary suspend and reset operations.

Figure 7:
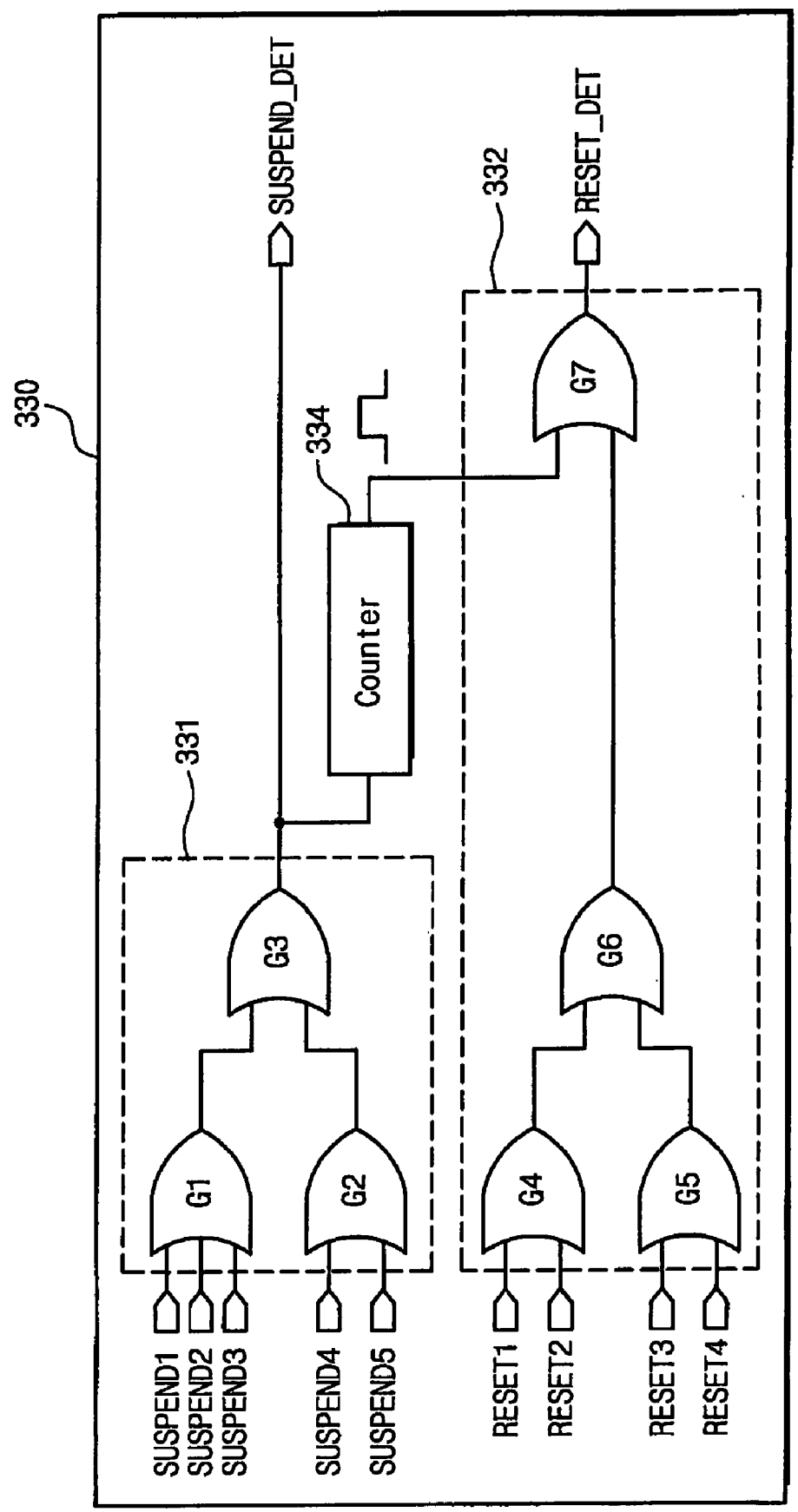
FIG. 7 is a circuit diagram illustrating the control signal generator shown in FIG. 5, according to an exemplary embodiment of the present invention.

FIG. 7 is a circuit diagram illustrating the control signal generator 330 shown in FIG. 5, according to an exemplary embodiment of the present invention.

Referring to FIG. 7, the control signal generator 330 includes a suspend detection signal generator 331, a reset detection signal generator 332 and a counter 334. The suspend detection signal generator 331 includes OR gates G1 to G3 and outputs the suspend detection signal SUSPEND_DET in response to the suspend signals SUSPEND1 to SUSPEND5. The reset detection signal generator 332 includes OR gates G4 to G7 and outputs the reset detection signal RESET_DET in response to the reset signals RESET1 to RESET4.

The counter 334 begins a counting operation in response to activation of the suspend detection signal SUSPEND_DET and outputs a pulse signal after a predetermined time. The counting operation of the counter 334 stops in response to inactivation of the suspend detection signal SUSPEND_DET. An operation of the CPU 100, which has been suspended, is held in the suspended state until the suspend detection signal SUSPEND_DET becomes inactive. However, if the suspend state continues, the IC card 1000 cannot resume any operation, which may extend over a prolonged period of time. Therefore, a predetermined time may be established as the maximum time the CPU 100 should maintain the suspended state. The counter 334 generates a pulse signal when the suspend detection signal SUSPEND_DET is active for the predetermined time established in the counter 334. The reset detection signal generator 332 activates the reset detection signal RESET_DET, in response to the pulse signal from the counter 334, in response to which the CPU 100 conducts an initializing operation.

Figure 8:
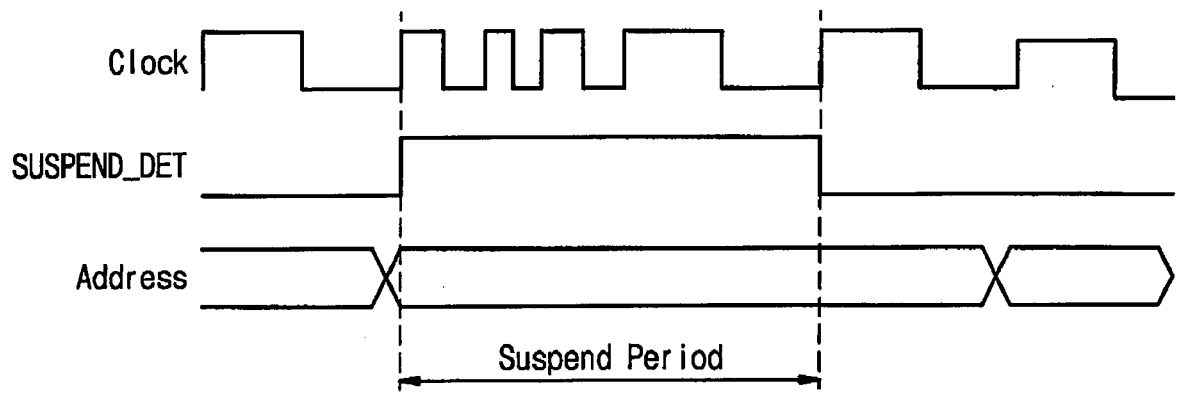
FIG. 8 is a timing diagram showing an operation of the integrated circuit card, according to an exemplary embodiment of the present invention.

FIG. 8 is a timing diagram showing an example operation of the IC card 1000, according to an exemplary embodiment of the present invention. Operations of the IC card 1000 will be described with reference to the drawings.

When there is variation in a frequency of a clock signal applied to the IC card 1000, the external condition detecting block 310 of FIG. 4, i.e., the frequency detector 310a, determines whether the frequency of the clock signal is in the suspend region. When it determines that the frequency of the clock signal is in the suspend region, the frequency detector 310a activates the suspend signal SUSPEND3. The control signal generator 330 activates the suspend detection signal SUSPEND_DET in response to activation of the suspend signal SUSPEND3, which suspends operation of the CPU 100. At the same time, the counter 334 begins the counting operation in response to activation of the suspend detection signal SUSPEND_DET.

As the CPU 100 would malfunction when an external condition becomes unstable, suspending the operation the CPU 100 avoids the insecurity caused by the unstable external condition. When the frequency of the clock signal returns to the normal region, the frequency detector 310a inactivates the suspend signal SUSPEND3, and the control signal generator 330 accordingly inactivates the suspend detection signal SUSPEND_DET. Thus, the CPU 100 resumes the previously suspended operation. At the same time, the counter 334 stops the counting operation in response to inactivation of the suspend detection signal SUSPEND_DET.

However, if the unstable state were to continue, e.g., the suspend detection signal SUSPEND_DET continues to be activated, the counter 334 would generate the pulse signal after a predetermined time period. The reset detection signal generator 332 then activates the reset detection signal RESET_DET in response to the pulse signal from the counter 334. The CPU 100 then performs an initialization.

Although the foregoing discussion is directed to condition detection involving a variable frequency clock signal, the IC card 1000 according to the embodiments of the present invention operates in substantially the same manner with respect to detected variations in external power source voltage, internal power source voltage, temperature or any other condition that potentially affects performance of the IC card 100. Therefore, the description of the condition detection operation for each of these variables will not be repeated herein.

Figure 9:
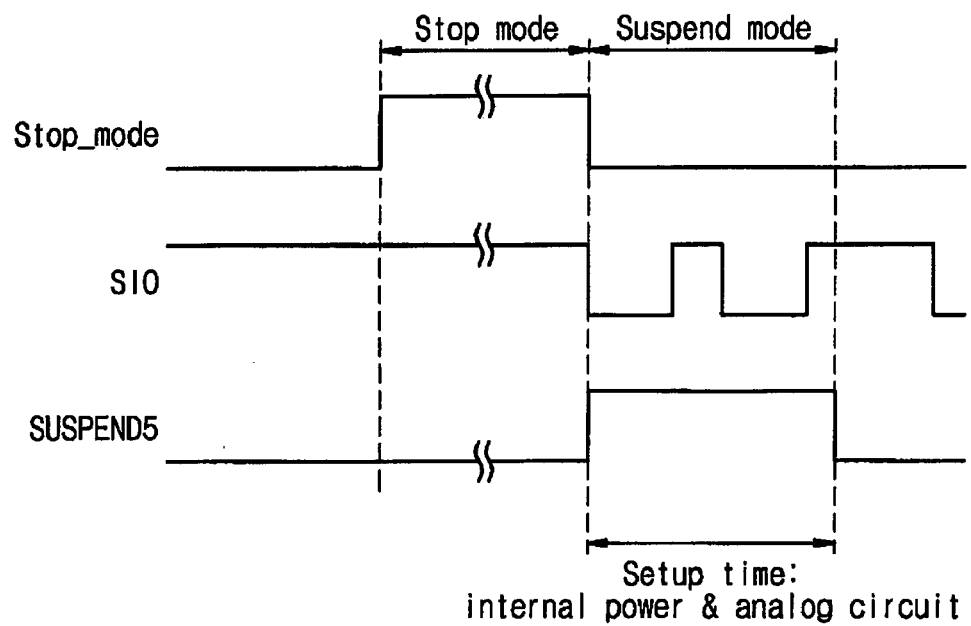
FIG. 9 is a timing diagram showing an operation of the mode conversion detector of FIG. 5, according to an exemplary embodiment of the present invention.

The mode change detector 320b activates the suspend signal SUSPEND5 for a predetermined time when an operation mode of the IC card 1000 is changed. For example, when the IC card 1000 changes to the normal mode from a stop mode, as illustrated in FIG. 9, the mode change detector 320b activates the suspend signal SUSPEND5. As previously discussed, in response to activation of the suspend signal SUSPEND5, the CPU 100 is set to the suspend state during an active period of the suspend signal SUSPEND5 to secure stable operation of the IC card 1000.

For example, when the IC card 1000 operates as a slave device in a master-slave environment, it must wait for a command from the master device (e.g., a card reader). During this waiting (or standby) state, the IC card 1000 goes into a stop (or sleep) mode for the purpose of reducing current consumption of the IC card 1000. When the IC card 1000 employs a circuit for generating an internal power source voltage, a setup time is required for stabilizing the internal power source voltage and an analog circuit (SIO) when subsequently awaking from the stop mode. Therefore, the IC card 1000 is held in the suspend state during the setup time, as shown in FIG. 9 to promote stable operation of the IC card 1000.

A described above, security and stability of an IC card may be improved by suspending an operation of the IC card in response to detected operational environments of the IC card.

The above-disclosed subject matter is to be considered illustrative, and not restrictive. Thus, while the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. An integrated circuit card comprising:
   a central processing unit;
   a memory for storing data to be processed by the central processing unit; and
   an abnormal condition detector for detecting whether at least one operating condition of the integrated circuit card is within one of a suspend region or a reset region wherein the abnormal condition detector causes the operation of the central processing unit to be suspended in a suspend state when the at least one operating condition is in the suspend region, and wherein the abnormal condition detector causes the operation of the central processing unit to resume when the at least one operating condition is stabilized in a normal region after being in the suspend region, and causes the central processing unit to initialize when the at least one operating condition continues in the suspend state for a predetermined period of time.

2. The integrated circuit card as set forth in claim 1, wherein when the at least one operating condition is in the reset region, the abnormal condition detector causes the central processing unit to initialize.

3. The integrated circuit card as set forth in claim 1, wherein when the abnormal condition detector detects a change of an operation mode of the central processing unit, the abnormal condition detector causes the operation of the central processing unit to be suspended.

4. The integrated circuit card as set forth in claim 3, wherein the change of the operation mode of the central processing unit comprises a change to a normal mode from a stop mode.

5. The integrated circuit card as set forth in claim 1, wherein the at least one operating condition comprises at least one of an external power source voltage, a frequency of a clock signal, temperature and an internal power source voltage.

6. The integrated circuit card as set forth in claim 5, wherein detecting functions of the at least one operating condition is selectively performed by a host.

7. An integrated circuit card comprising:
a central processing unit;
a memory for storing data to be processed by the central processing unit;
an external condition detecting block for detecting whether an external operating condition is within one of a suspend region or a reset region, and for outputting corresponding suspend information or reset information based on the external condition detection;
an internal condition detecting block for detecting whether an internal operating condition is in a suspend region or a reset region, and for outputting corresponding suspend information or reset information based on the internal condition detection; and
a control signal generator for selectively activating a suspend detection signal in response to the suspend information from at least one of the external and internal condition detectors and a reset detection signal in response to the reset information output from at least one of the external and internal condition detectors,
wherein an operation of the central processing unit is suspended in response to activation of the suspend detection signal and initialized in response to activation of the reset detection signal, and
wherein the external condition detecting block comprises:
an external voltage detector for activating one of a first suspend signal as the suspend information or a first reset signal as the reset information based on whether an external power source voltage is in an external voltage suspend region or an external voltage reset region;
a temperature detector for activating one of a second suspend signal as the suspend information or a second reset signal as the reset information based on whether a temperature is in a temperature suspend region or a temperature reset region; and
a frequency detector for activating a third suspend signal as the suspend information or a third reset signal as the reset information based on whether a frequency of a clock signal is in a frequency suspend region or a frequency reset region; and
wherein the internal condition detecting block comprises:
an internal voltage detector activating a fourth suspend signal as the suspend information or a fourth reset signal as the reset information based on whether an internal power source voltage is in an internal voltage suspend region or an internal voltage reset state.

8. The integrated circuit card as set forth in claim 7, wherein the control signal generator activates the reset detection signal when the suspend detection signal remains activated for a predetermined period of time.

9. The integrated circuit card as set forth in claim 7, wherein the internal condition detecting block further comprises a mode change detector configured to detect a change of an operation mode and output the suspend information based on the detected change.

10. The integrated circuit card as set forth in claim 9, wherein when the operation mode changes to a normal mode from a stop mode, the internal condition detecting block outputs the suspend information for a predetermined time, and the control signal generator activates the suspend detection signal in response to the suspend information.

11. The integrated circuit card as set forth in claim 7, wherein detecting functions of the external operating condition and the internal operating condition are selectively performed by a host.

12. The integrated circuit card as set forth in claim 7, wherein the control signal generator comprises:
a suspend detection signal generator for activating the suspend detection signal in response to at least one of the first through fourth suspend signals;
a counter for beginning a counting operation upon activation of the suspend detection signal and stopping the counting operation upon inactivation of the suspend detection signal; and
a reset detection signal generator for activating the reset detection signal in response to at least one the first through fourth reset signals and an output of the counter.

13. The integrated circuit card as set forth in claim 12, wherein the counter generates a pulse signal when the suspend detection signal continues to be active for a predetermined time and the reset detection signal generator activates the reset detection signal in response to the pulse signal.

* * * * *